(12) United States Patent
Xing

(10) Patent No.: US 8,768,790 B2
(45) Date of Patent: Jul. 1, 2014

(54) PRODUCT-FAMILY INVENTORY REPLENISHMENT SYSTEM USING A COMPOSITE PRODUCT MIX FRAMEWORK

(75) Inventor: Zhouding Xing, Johns Creek, GA (US)

(73) Assignee: Logility, Inc., Atlanta, GA (US)

( * ) Notice: Subject to any disclaimer, the term of this patent is extended or adjusted under 35 U.S.C. 154(b) by 279 days.

(21) Appl. No.: 13/421,534

(22) Filed: Mar. 15, 2012

(65) Prior Publication Data

US 2013/0246228 A1    Sep. 19, 2013

(51) Int. Cl.
*G06Q 10/00*    (2012.01)
*G06Q 10/08*    (2012.01)

(52) U.S. Cl.
CPC ................................... *G06Q 10/087* (2013.01)
USPC ............................................ 705/28; 705/22

(58) Field of Classification Search
CPC ...................................................... G06Q 10/087
USPC ................................................ 705/8, 22, 28
See application file for complete search history.

(56) References Cited

U.S. PATENT DOCUMENTS 5,953,707 A * 9/1999 Huang et al. ................. 705/7.31

* cited by examiner

*Primary Examiner* — Ryan Zeender
*Assistant Examiner* — Hunter Wilder
(74) *Attorney, Agent, or Firm* — Haynes and Boone, LLP

(57) ABSTRACT

In accordance with embodiments of the present disclosure, systems and methods for inventory replenishment utilize supply chain data comprising a demand mix, an inventory mix, and a composite product mix to generate a new composite product mix for at least one future period. The system geometrically discounts demand-inventory composite data. Thus, the older data carries less weight in determination of the new composite product mix percentage. Smoothing factors allow the discounting to be applied differently to demand and inventory data. The new composite product mix and an estimate of the total target replenishment quantity of a product family are used to estimate individual target replenishment quantities for each of a plurality of individual products in a product family. Replenishment quantities can be determined for an extended planning horizon. A server may provide the replenishment quantities to the user of a client computer over a computer network.

17 Claims, 5 Drawing Sheets

PRODUCT-FAMILY INVENTORY REPLENISHMENT SYSTEM USING A COMPOSITE PRODUCT MIX FRAMEWORK

BACKGROUND OF THE INVENTION

1. Field of the Invention

Embodiments of this invention relate generally to implementations of supply chain management systems. More particularly, embodiments relate to systems for generating estimates of required supplies of individual products within a family of products.

2. Discussion of Related Art

As supply chains have stretched to span the globe, the complexity of supply chain management systems has increased along with the potential for significant cost savings by more effectively managing the chain. Meanwhile, increasing variety within a given family of products has added additional complexity that can be difficult to properly factor into supply chain management systems and methods.

Current electronic supply chain management methods and systems rely primarily on determinations based on the demand consumers exhibit for a family of products to generate estimates of future needs. It is generally regarded as easier to generate more accurate predictions for the total number of a company's "widgets" consumers will buy than for the individual numbers of each of the many different varieties in which the company may produce their "widgets". Several forecasting models have been implemented in supply chain management systems in efforts to more accurately forecast demand at the product family level, including: simple exponential smoothing, the Box-Jenkins model, and the Holt-Winters model.

A common approach may be to use a forecast for the product family and a demand mix to create individual product level forecasts. Individual target replenishment quantities are then determined by simply offsetting the demand forecast by the projected inventory. In addition to other failings, this approach ignores the information available in historical inventory data, which like demand can fluctuate over time. Taking into account the supply management difficulties caused by vender-imposed minimums and constraints on production capacity further complicates forecasting efforts.

Therefore, there is a need for better estimation of inventory replenishment and quantity adjustment for individual products within a family of products to account for these difficulties.

SUMMARY

In accordance with some embodiments of the present invention a system and method for providing replenishment quantity estimates for a family of products in a supply chain management system is provided. A system for forecasting the future supply chain needs of a plurality of individual products within a product family can include a data storage device storing at least a current composite product mix, wherein the current composite product mix comprises percentages for the plurality of individual products within the product family; a computer processor operable to receive a first parameter and a second parameter for the product family, receive the current composite product mix, a current demand mix, and a current inventory mix, the mixes being associated with the single product family, generate a new composite product mix, the new composite product mix being based on: the first and second parameters, the current demand mix, the current inventory mix, and the current composite product mix; and a display in connection with the computer processor for communicating the new composite product mix.

A method for creating a new composite product mix of a product family can include receiving a first parameter and a second parameter into a data storage device; receiving a current composite product mix, a current demand mix, and a current inventory mix, the mixes being associated with the product family, into the data storage device; generating, by use of a computer processor, a new composite product mix associated with the product family, the new composite product mix based on the first and second parameters, the current composite product mix, the current demand mix, and the current inventory mix; receiving a total target replenishment quantity for the product family; and generating a plurality of individual target replenishment quantities for each of a plurality of individual products within the product family based on the new composite product mix and the total target replenishment quantity.

In some embodiments, a non-transitory machine-readable medium can include a plurality of machine-readable instructions which when executed by one or more processors of a computer are adapted to cause the computer to perform a method including receiving a first parameter and a second parameter; receiving a current composite product mix for a plurality of individual products within a product family, the current composite product mix containing a plurality of percentage values corresponding to each of the plurality of individual products; receiving a current demand mix and a current inventory mix wherein the mixes are associated with the product family; generating a new composite product mix for the plurality of individual products within the product family, the new composite product mix being generated based on the first and second parameters, the current demand mix, the current inventory mix, and the current composite product mix; and generating a target replenishment quantity of each of the plurality of individual products using the current composite product mix.

These and other embodiments are further discussed below with reference to the following figures.

BRIEF DESCRIPTION OF THE DRAWINGS

Advantages of the present invention will become apparent to those skilled in the art with the benefit of the following detailed description of embodiments and upon reference to the accompanying drawings in which.

Figure 1:
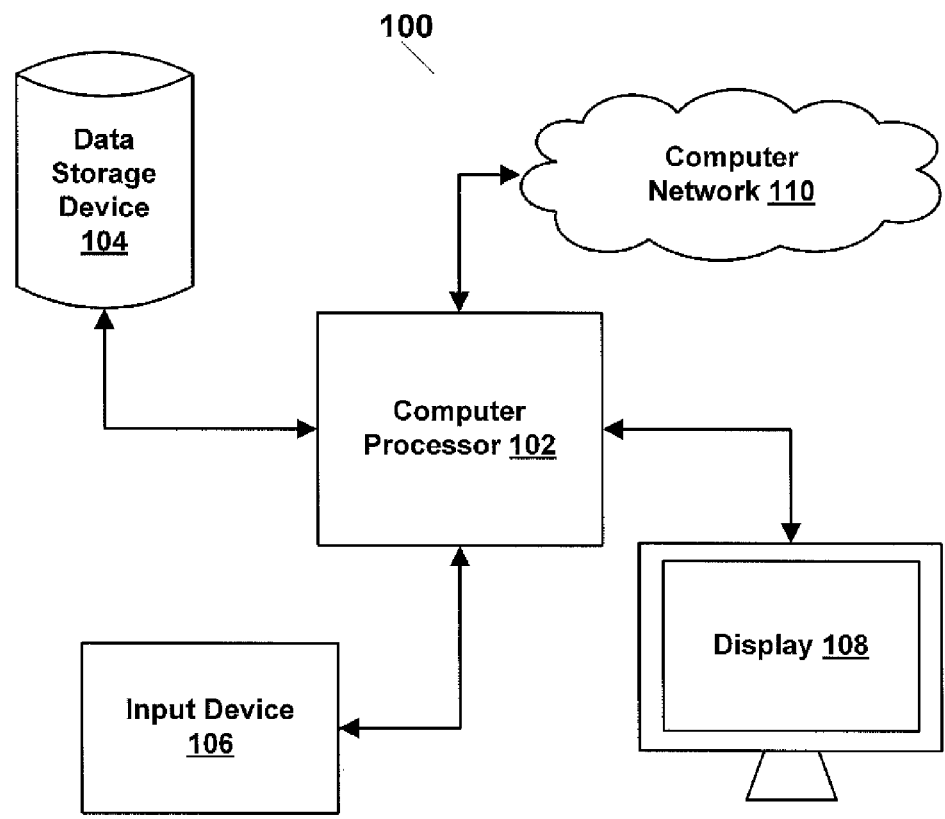
FIG. 1 depicts a system for forecasting individual target replenishment quantities for a plurality of individual products in a product family by using a composite product mix.

Embodiments of the present disclosure and their advantages are best understood by referring to the detailed description that follows. In the figures, elements having the same numerical designation may or may not have the same or similar functions. The re-use of numerical designations may be useful to clarify and simply embodiments of the invention, but should not be construed as limiting.

DETAILED DESCRIPTION

Some embodiments of the present invention provide methods and systems for a supply chain management system. The methods and systems involve the use of historical supply chain information such as point of sales (POS) or demand data, inventory data, and previous forecasts for which a company may keep extensive electronic records. The methods and systems are intended to facilitate more useful and consistent forecasting and replenishment planning at the level of individual products within a given product family.

Consistent with some embodiments, a method for forecasting the supply chain needs of an individual product within a product family is disclosed. In an exemplary embodiment, the method may begin by receiving a first parameter and a second parameter into a data storage device and receiving a current composite product mix, a current demand mix, and a current inventory mix, the mixes being associated with the product family, into the data storage device as well. The method may continue by generating, by use of a computer processor, a new composite product mix associated with the product family, the new composite product mix based on the first and second parameters, the current composite product mix, the current demand mix, and the current inventory mix. A total target replenishment quantity for the product family may be received and used for generating a plurality of individual target replenishment quantities for each of a plurality of individual products within the product family based on the new composite product mix and the total target replenishment quantity.

In some embodiments, a system is provided which includes a data storage device storing at least a current composite product mix and a computer processor operable to receive first and second parameters via an input device. The computer processor may be further operable to receive the current composite product mix, a current demand mix, and a current inventory mix for a product family. Based on the received inputs, the computer processor generates a new composite product mix, and cause the new composite product mix to be communicated to a user in a coupled display.

Some embodiments of the invention includes a non-transitory machine-readable medium comprising a plurality of machine-readable instructions which when executed by one or more processors of a computer are adapted to cause the computer to perform a method. The method comprises receiving a first parameter, a second parameter; and a current composite product mix for a plurality of individual products within a product family. The current composite product mix contains a set of percentage values, one percentage value corresponding to each of the plurality of individual products. The method also comprises receiving a current demand mix and a current inventory mix associated with the product family and then generating a new composite product mix based on the first and second parameters, the current demand mix, the current inventory mix, and the current composite product mix. The method may terminate after generating a target replenishment quantity of each of the plurality of individual products using the new composite product mix.

Embodiments of the present disclosure are directed to systems and methods for providing replenishment quantity estimate for a family of products in a supply chain management system. Various factors may affect current demand for an individual product including shifts in consumer preferences, seasonality of products, and also sales promotions. On the inventory side, a scheduled delivery may be late, products may be returned or need to be scrapped at higher rates than anticipated, and the lot sizing requirements of a product may alter the rate at which new orders should be made. Embodiments of the present disclosure provide an effective way to incorporate current and historical inventory levels into supply need forecasts. Embodiments of the present disclosure also provide a consistent mechanism through which to make such important supply chain management determinations regarding inventory replenishment and adjustments.

FIG. 1 shows an exemplary embodiment of a system 100 to facilitate planning individual target replenishment quantities for all the individual products in a given family of products. The particular embodiment illustrated in FIG. 1 includes a computer processor 102 for performing computations and/or requesting and receiving data. The computer processor 102 may be understood as a central processing unit. It may also be understood as a personal computer and can include a CPU, RAM, a motherboard, a hard disk drive and other drives such as a DVD drive, and a networking card, and/or other devices. The computer processor 102 may access data through several different methods. An input device 106 may be supplied to allow a user of the system to directly input data in a way that makes it accessible to the computer processor 102. For example, input device 106 may be a keyboard, mouse, or touchscreen or a combination thereof, and may include software menus with selectable data values. Input device 106 may also include a bar code reader or radio-frequency identification input device that can capture point-of-sale data and transmit them to computer processor 102. Computer processor 102 may operate on data that is stored on a data storage device 104, which is a device capable of storing computerized data and may be a hard disk drive, a solid-state drive, a CD-ROM, Flash memory, RAM, or other similar type of data storage device. Computer processor 102 is in communication with the data storage device 104.

Computer processor 102 may also be in connection with a computer network 110. Computer network 110 may be an intranet or the Internet and may include a plurality of servers and networked data storage devices. Computer processor 102 may be configured to request and receive data from input device 106, data storage device 104, and computer network 110. Computer processor 102 may also be able to transmit data to the data storage device 104 and the computer network 110 through a network interface card (not shown).

Computer processor 102 may be in communication with a display 108. Display 108 may be a CRT or LCD monitor, a printer, an audio device, or any device capable of making the data intelligible to the user. Computer processor 102 is operable to generate a new composite product mix by accessing data stored in data storage device 104 and then performing computations, as will be disclosed later, in order to generate the new composite product mix.

Figure 2:
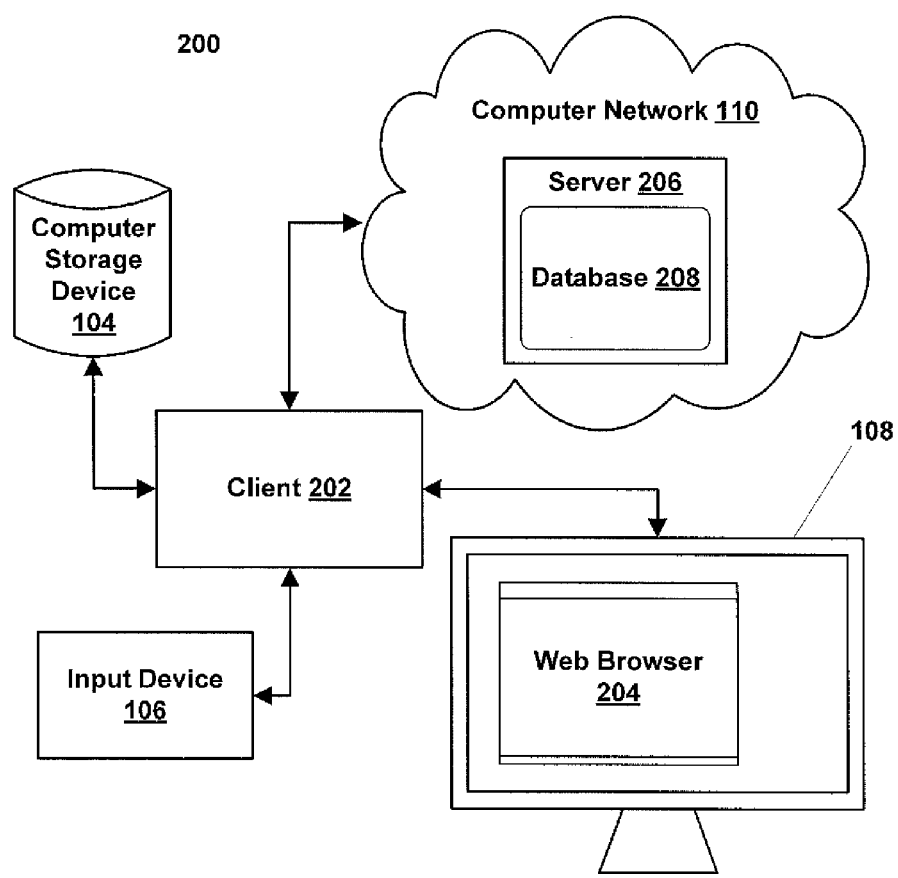
FIG. 2 depicts a client-server embodiment of a system for forecasting individual target replenishment quantities for the individual products of a product family by using a composite product mix.

FIG. 2 shows an exemplary embodiment of a system 200 for making a consistent determination of individual product quantities of a product family to purchase. Some of the features in the embodiment depicted in FIG. 2 may be similarly depicted in FIG. 1. FIG. 2 includes a client 202. Client 202 may be a personal computer such as might run an operating system like Windows®, Mac OS X®, or Linux®, etc. Alternatively, the client 202 may be a mobile device, such as a smartphone, tablet, or PDA running Android™, Windows® Phone, iOS®, or similar type of operating system. The client 202 may be considered to have all the capabilities of computer processor 102. The client 202 may use a web browser 204 as an interface to communicate with a server 206 via computer network 110. Like client 202, server 206 may be considered to have at least all the capabilities of computer processor 102 as disclosure herein. Additionally, server 206 may utilize multi-threading technology. Web browser 204 may be any one of a large number of modern web browsers, including Internet Explorer®, Firefox®, and Safari®, etc. Using the web browser 204 running on client 202, the user may access data stored remotely in database 208 available via server 206 on computer network 110. Database 208 may be a relational database such as MySQL®, SQL Server®, Oracle DB, or other suitable database or databases. In other embodiments the database 208 may be on client 202.

The server 206 is operable to generate a new composite product mix. The server 206 may access data stored in database 208 and then perform computations in order to generate the new composite product mix. The server 206 may then communicate the results to the client 202 which, in turn, may communicate the results to the user via web browser 202. Server 206 may further compute target individual product purchase quantities using the new composite product mix.

Figure 3:
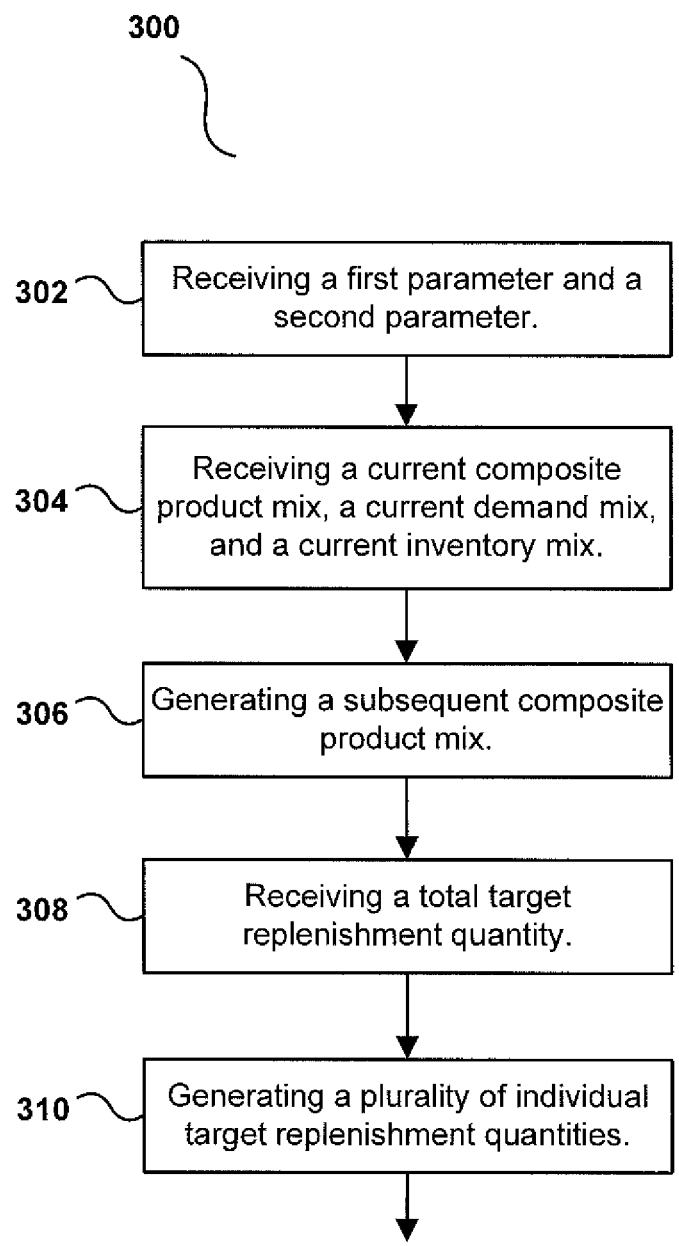
FIG. 3 depicts a flowchart of a method for generating a composite product mix and forecasting individual target replenishment quantities for a product family.

FIG. 3 depicts a flowchart of a method 300 for generating a plurality of individual target replenishment quantities. By way of example, method 300 begins with step 302 when the computer processor 102 receives a first and a second parameter. At step 304 the computer processor 102 receives a current demand mix, a current inventory mix, and a current composite product mix, all associated with a current operational period. The computer processor 102 may receive these three mixes and the two parameters in many ways from several different sources, some of which are described in various embodiments described herein.

At step 306, the computer processor 102 generates a new composite product mix by performing computations on the current demand mix, the current inventory mix, the current composite product mix, and the first and second parameters. The new composite product mix is a set of percentage values totaling 100%, with a percentage value associated with each of a plurality of individual products within a single product family. The new composite product mix is associated with at least one upcoming operational period. Computer processor 102 computes the new composite product mix according to $P_{k,t+1}=\beta(\alpha D_{k,t}+(1-\alpha)I_{k,t})+(1-\beta)P_{k,t}$, wherein:

$\beta$ is a real number equal to or between 0 and 1;

$\alpha$ is a real number equal to or between 0 and 1;

$D_{k,t}$ is a current demand mix component for an individual product k at a time t;

$I_{k,t}$ is a current inventory mix component for k at t;

$P_{k,t}$ is a current composite product mix component for k at t; and $P_{k,t+1}$ is a new composite product mix component for k at t+1.

The computation of the new composite product mix involves a first parameter $\alpha$ and a second parameter $\beta$. These two parameters allow for smoothing of the historical data in accordance with a user's particular needs. This will be discussed in more detail further below.

Using the new composite product mix and a total target replenishment quantity (i.e. a target replenishment quantity for the entire product family), a user can determine individual target replenishment quantities for a plurality of individual products in a given product family. The use of the new composite product mix allows for a consistent method of integrating current and historical demand and inventory data in order to determine the distribution of a total target replenishment quantity amongst the individual products of the family as part of an inventory replenishment or adjustment process. This is done in steps 308 and 310.

In step 308, the computer processor 102 receives a total target replenishment quantity. As is the case with other data received by computer processor 102, there are many ways, some of which are disclosed in exemplary embodiments herein, in which computer processor 102 can receive the total target replenishment quantity. The computer processor 102 uses the total target replenishment quantity and the new composite product mix to generate a plurality of individual target replenishment quantities in step 310.

The following non-limiting example may be useful in understanding how method 300 generates the new composite product mix and how it may be used in supply chain management systems such as systems 100 and 200 described above.

To greatly simplify the operations of the systems and methods, the following example utilizes only two periods: a current period and an upcoming period for which the forecasted or new composite product mix will be computed. In practice, the number of periods used by the system may include the current period and all past periods for which a user or a database can supply the needed data. Additionally forecasts of all future periods for which total target replenishment quantities are available may be computed as well.

A company may sell a family of products with many different individual products. For example, an apparel company may sell a line of shirts that are available in five different colors: white, blue, red, yellow, and gray. The line of shirts is the product family; the five different colored shirts are the individual products. During the current operating period, the company may receive or have received orders for shirts as seen in Table 1 below. The numerical examples in the tables that follow are simplified and may contain rounding errors. The example is intended to illustrate exemplary embodiments of the invention.

TABLE 1

| Shirt Color | Quantity Demanded | Demand Mix [%] |
|---|---|---|
| White | 400 | 36.4 |
| Blue | 300 | 27.3 |
| Red | 150 | 13.6 |
| Yellow | 150 | 13.6 |
| Gray | 100 | 9.1 |
| All Colors | 1100 | |

Given the individual demand for the five different colors of shirts, a demand mix can be created for the current period by dividing the quantity demanded for a single color shirt by the total quantity demanded for all colors. This current demand mix is used later to generate the new composite product mix and allows the new composite product mix to incorporate information regarding the demand side in forecasting individual purchase quantities. The demand mix can be received by computer processor 102 by accessing it on data storage device 104, having a user enter it with the input device 106, or accessing it in database 208 over computer network 110.

Additionally, an inventory mix for the current period is used to generate the new composite product mix. In the preceding and following statements, "inventory quantity" and "quantity in inventory" may refer to a projected inventory quantity. This projected inventory quantity is determined by the sum of the quantity on-hand and the quantity ordered from the company's suppliers scheduled to be received within the given period, minus the quantity ordered by the company's customers scheduled to be shipped out within that period. Given the example of five different colors available in the shirt line, the current inventory mix is computed by taking the reciprocal of the quantity in inventory of each of the individual products (i.e., shirts of one color) and then dividing that reciprocal by the sum of all the reciprocals of all the quantities of the individual products in the product family. Given inventory quantities of 300, 350, 200, 225, and 50 for white, blue, red, yellow, and gray shirts respectively, the computation of the current inventory mix value for gray shirts would be as follows:

$$\frac{\frac{1}{50(\text{gray})}}{\frac{1}{300(\text{white})} + \frac{1}{350(\text{blue})} + \frac{1}{200(\text{red})} + \frac{1}{225(\text{yellow})} + \frac{1}{50(\text{gray})}}$$

The full inventory mix for the product family can be seen in Table 2 below.

TABLE 2

| Shirt Color | Quantity in Inventory | Inventory Mix [%] |
|---|---|---|
| White | 300 | 9.4 |
| Blue | 350 | 8.0 |
| Red | 200 | 14.0 |
| Yellow | 225 | 12.5 |
| Gray | 50 | 56.1 |
| All Colors | 1125 | |

The values in Table 2 make up the current inventory mix. The methods herein for calculating an inventory mix necessitate a minor adjustment in the special case where the inventory quantity of any individual product is zero. In such a case the computer processor 102 or the server 206 performing the computations, or executing instructions that implement the performance of the computations, should increase all of the inventory quantities by one. Thus the inventory quantity that was zero will become one, and all of the non-zero quantities will be increased by one. The computation will then be performed as disclosed above. The use of the current inventory mix may allow a user to obtain higher quality forecasts at the individual product level. Further, the use of the current inventory mix as disclosed above allows a consistent method to utilize important data that can often be volatile and thus difficult to work with.

Next, the system will use the current demand mix and current inventory mix as shown above to create the new composite product mix, Again, the new composite product mix is computed according to the equation $P_{k,t+1} = \beta(\alpha D_{k,t} + (1-\alpha)I_{k,t}) + (1-\beta)P_{k,t}$, as has been explained above.

The first and second parameters, $\alpha$ and $\beta$ respectively, allow for smoothing of the historical data in accordance with a user's particular needs. Specifically, $\alpha$ allows a user of the system to smooth between the demand mix or mixes, $D_{k,t}$, and the inventory mix or mixes, $I_{k,t}$. If the user has more confidence in the demand mix data, the user can select or input a higher value for a by input device 106. Or if the user has more confidence in the inventory mix data, the user can select or input a lower value for $\alpha$. The second parameter $\beta$ allows a user to smooth out the current inventory and demand data on one hand and the current composite product mix data on the other. The current composite product mix is typically derived based on the exponential smoothing principle using potentially large amounts of historical inventory and demand data from many past planning/operation periods. A high level for $\beta$ allows the system to be more responsive to the most recent changes in demand and inventory, while a low level for $\beta$ increases the weight of older data. The user may exercise discretion in this limited area.

The extreme values of $\alpha$, zero and one, result in special variations of the forecasting system. If value of $\alpha$ is one, the new composite product mix is based on the current demand mix and the current composite product mix, ignoring the current inventory mix. If $\alpha$ is zero the new composite product mix will be based on the current inventory mix and the current composite product mix, ignoring the current demand mix. A user may appropriately select or input the extremes based on the availability of and confidence in current demand and inventory data.

When decisions regarding inventory replenishment arise during the upcoming planning period, the company can use the new composite product mix to compute the quantity of each color shirt to be purchased when the total quantity of all shirts to be purchased is known or previously estimated. Thus the system provides a consistent framework for using demand and inventory data to determine and forecast future purchase quantities on the individual-product level for an upcoming period or periods.

Table 3 below presents an example, with two periods of concern only, of the inputs and outputs of an iteration of the system using $\alpha = 0.7$ and $\beta = 0.2$ and an exemplary current composite product mix.

TABLE 3

| Shirt Color | Current Demand Mix [%] | Current Inventory Mix [%] | Current Composite Product Mix [%] | New Composite Product Mix [%] |
|---|---|---|---|---|
| White | 36.4 | 9.4 | 15.0 | 17.7 |
| Blue | 27.3 | 8.0 | 25.0 | 24.3 |
| Red | 13.6 | 14.0 | 30.0 | 26.8 |
| Yellow | 13.6 | 12.5 | 10.0 | 10.7 |
| Gray | 9.1 | 56.1 | 20.0 | 20.5 |

The system may return the new composite product mix to the user and/or may use a total target replenishment quantity for the product family to return specific purchase quantities for each of the individual products to the user. If the total target replenishment quantity for the upcoming period were 10,000, the new composite product mix would indicate that approximately 1,770 white, 2,430 blue, 2,680 red, 1,070 yellow, and 2,050 gray shirts should be ordered.

In comparison with the above two-period example, in many embodiments and applications of the disclosed methods and systems significantly more data is available to create and use demand and inventory mixes. Frequently, a time series of data will be available beginning in the period in which a product family is launched. The demand and inventory data for as many periods as are available can be used in the disclosed methods and systems. The data may be stored in files, such as a spreadsheet or delimited text file, in the data storage device 104, or the data may be stored in the database 208. The inventory and demand data may be stored in a comparatively raw form, but the data may also be stored in time series of inventory and demand mixes as disclosed above. Additionally, a time series of composite product mixes computed for the product family may be generated using the historical demand and inventory mixes. The time series of composite product mixes may also be stored on data storage device 104 or in database 208, with the current composite product mix, the most recent in the time series, easily available for replenishment planning. The storage of the computed historical mixes may be used for computing the forecast error as will be discussed later. Alternatively, the computer processor 102 or server 206 may perform the computations as necessary to generate a new composite product mix from raw data when a user so requests.

When the methods and systems are applied to a new product family (i.e., a product family for which there is no existing historical data), the computer processor 102 or server 206 may use zero as the values for the demand mix $D_{k,0}$ (which at product launch is not known) and the composite product mix $P_{k,0}$. This means that $P_{k,1}$ will be based on $I_{k,0}$ only, which will not be zero since there may be existing inventory at product launch in a make-to-stock approach. Alternatively, processor 102 or server 206 may request an input from a user for the value of $P_{k,1}$ or may use a composite product mix from a similar product family that has available historical data.

Further, the above method may be used to forecast target individual purchase quantities for more than one future period. If the company has estimates of the total target replenishment quantities throughout a forecast horizon of four months (for example, monthly periods for October, November, December, and January), each of those quantities can be multiplied by the new composite product mix to create a replenishment forecast for all four periods. Assuming the total target replenishment quantities for the next four periods are 10,000, 12,500, 14,000, and 7,000, an approximate example can be seen in Table 4 below:

TABLE 4

| Shirt Color | Period 1 (October) | Period 2 (November) | Period 3 (December) | Period 4 (January) |
|---|---|---|---|---|
| White | 1,770 | 2,210 | 2,480 | 1,240 |
| Blue | 2,430 | 3,040 | 3,400 | 1,700 |
| Red | 2,680 | 3,350 | 3,750 | 1,880 |
| Yellow | 1,070 | 1,340 | 1,500 | 750 |
| Gray | 2,050 | 2,560 | 2,870 | 1,430 |

Figure 4:
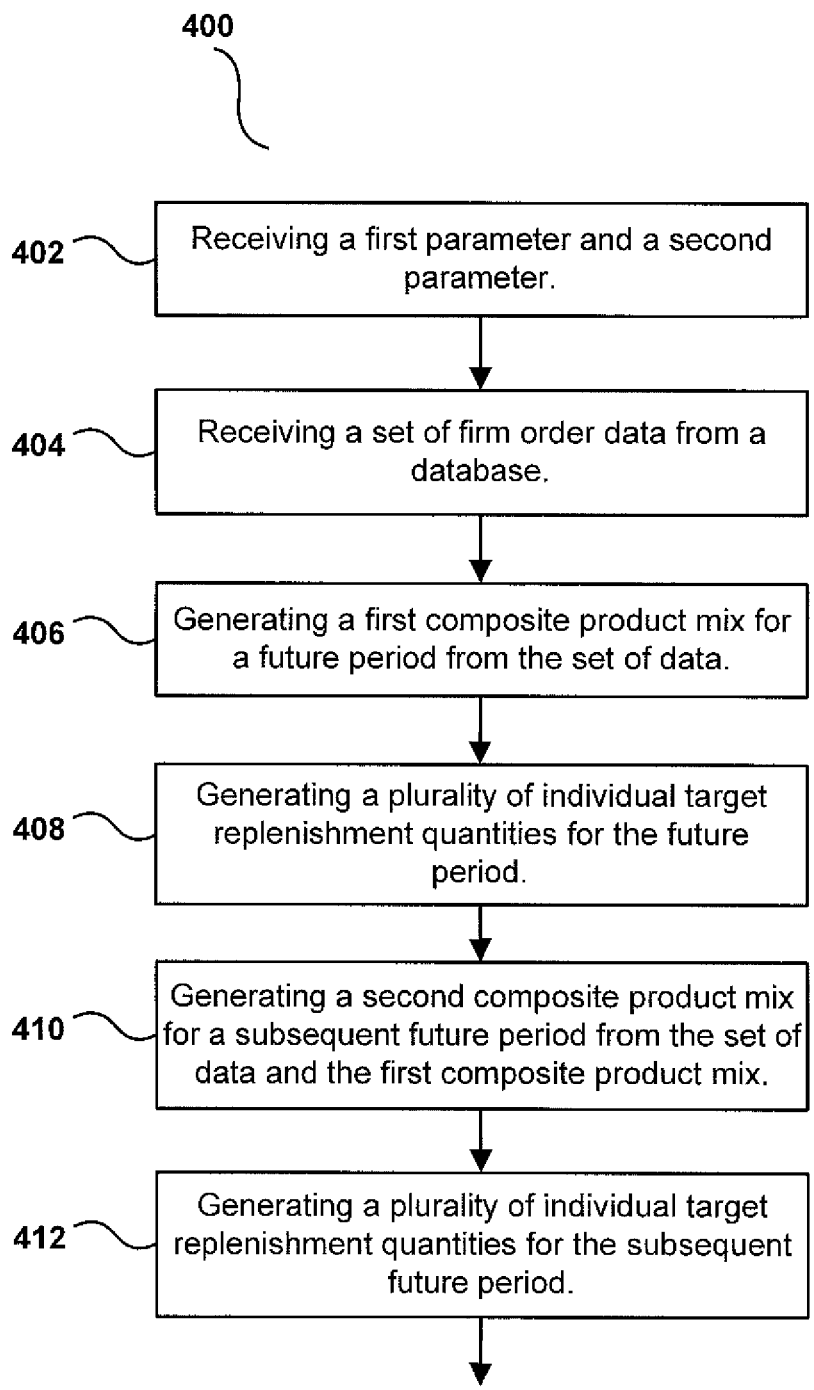
FIG. 4 depicts a flowchart of a method for generating a composite product mix and forecasting individual target replenishment quantities for a product family for a plurality of future time periods in a time horizon.

FIG. 4 is a flowchart of a method 400 which may incorporate more future data or projected data than just a total target replenishment quantity in forecasting for a replenishment process as discussed above. In addition to the total target replenishment quantity, future data for making multi-period projections may include a demand forecast quantity, a customer order quantity, and a firm receipts quantity for each product and each time period in the horizon. Thus, method 400 may begin in step 402 by receiving a first parameter, $\alpha$, and a second parameter, $\beta$. This step may similar to step 302 as discussed above.

Step 404 continues by receiving a set of firm order data. The set of firm order database may be received from a database or a file on a data storage device, locally or through a computer network. The set of firm order data may include information regarding the future scheduled purchase and sales quantities of individual products in a family of products. Thus, the set of firm order data may include firm receipts, customer orders, production orders, transfer orders, purchase orders, and the like.

In step 406, a composite product mix may be computed for the product family for a future period, which may be the period of the time horizon nearest to the time the method is performed. This may be considered a rolling composite product mix, since each new composite product mix may be used to create a subsequent composite product mix, rolling it into each new period, as will be explained.

In step 408, individual target replenishment quantities for the future period may be generated. This may be done using the same formula as described earlier: $P_{k,t+1} = \beta(\alpha D_{k,t} + (1-\alpha)I_{k,t}) + (1-\beta)P_{k,t}$. The composite product mix may be multiplied by a total target replenishment quantity for the period to find individual target replenishment quantities for the period. The individual target replenishment quantities for the period may be used as the "planned receipts" in calculating the projected inventory mix for the next period to be calculated in the time horizon.

During step 408, projected inventory quantities may also be computed for the same period as in step 406. When incorporating future data such as the individual target replenishment quantity projections for several future periods, some changes to the methods described earlier may be desired. The projected inventory mix may be calculated from a projected available inventory quantity for each product for each subsequent period in place of the actual inventory data. This data may be accessed from a set of data for future periods, rather than a set of data for historical periods. Both sets may be stored locally or in a database. The projected available inventory quantity ($b_{k,t+1}$) may be the current period projected inventory mix ($b_{k,t}$) plus firm receipts ($e_{k,t+1}$) and planned receipts ($q_{k,t+1}$) minus the higher of a forecasted demand quantity ($f_{k,t+1}$) or customer orders for the future period ($c_{k,t+1}$). In expression form: $b_{k,t+1} = b_{k,t} + e_{k,t+1} + q_{k,t+1} -$ greater of ($f_{k,t+1}$ and $c_{k,t+1}$). Then the projected inventory mix may be computed by dividing the reciprocal of each product by the sum of the reciprocals of all products. This may be essentially the same computation as used earlier to calculate the inventory mix, but using the projected available inventory quantities instead of the actual inventory quantities.

In previously disclosed embodiments, the demand mix was calculated using the quantities actually demanded in the period for each of the individual products divided by the total quantity demanded. The calculation of the projected demand mix for a given projected period t may be performed as below:

$$D_{k,t} = \frac{\max(c_{k,t}, f_{k,t})}{\sum_{i=1}^{m} \max(c_{i,t}, f_{i,t})},$$

where m is the number of individual products in the family.

The "max( )" notation indicates that the greater of the two enclosed values is used in the calculation of $D_{k,t}$, while the lesser is not used. Thus, for a product k, if the firm customer order quantity ($c_{k,t}$) is greater than the traditional forecasted demand quantity ($f_{k,t}$), then the firm customer order quantity will be used for calculating that particular value for $D_{k,t}$. For another product j at t the opposite may be true, in which case the forecasted demand quantity for j at t will be used for $D_{j,t}$.

In step 410, after $D_{k,t}$ and $I_{k,t}$ have been determined, a composite product mix may be calculated for the subsequent future period, the next period in the time horizon. Using this composite product mix, the individual target replenishment quantities and available inventory may be calculated, in step 412.

The process may then repeat for each of the periods in the horizon. Thus, a new composite product mix may be calculated for each of the periods in the horizon, rather than using a single composite product mix for all the periods of the horizon. The projected inventory, demand, and composite product mixes may be rolled into the projections of the next period to be forecast in the horizon. In effect, the data from projected periods is treated as historical periods during the computation of every subsequent period in the horizon. Thus, there may be two distinct times series of data for the inventory, demand, and composite product mixes whenever a new period is calculated: a historical time series and a projected time series. When the desired number of projected periods for the horizon has been reached the method may stop.

Such a method may operate in the following manner on the disclosed systems. In step 402, a user may make a request using input device 106 in connection with client 202. The request may include instructions to calculate values for a time series of replenishment quantities for each product in a family of products and calculate values for a time series of projected available inventory quantities of each product. Client 202 may transmit the request to a server 206 accessible via the Internet.

In step 404, the server may query one or more databases, such as database 208, which may contain data including replenishment data, demand forecast data, customer order data, and firm receipts data for a desired product family. The number of periods in the horizon may form part of the user's request, or may be another value obtained by server 206 from database 208. After performing the necessary calculations, the server 206 may transmit the results to client 202 which may display them to the user in a window of web browser 204 on display 108. The server may also store the transmitted data in database 208 for use in future forecasts, for error calculation, or for viewing at a later time by the user.

Table 5 below illustrates an exemplary result for a product family of shirts with individual products in five colors as described in other examples above. Given $\alpha=0.7$, $\beta=0.2$, $P_{k,t}=17.7\%$ white, 24.3% blue, 26.8% red, 10.7% yellow, and 20.5% gray, and assuming an initial inventory of 94 white, 80 blue, 140 red, 60 yellow, and 70 gray shirts, the results may appear as follows for a five-period horizon:

TABLE 5

| | | Future Time Period t | | | | |
|---|---|---|---|---|---|---|
| | | 1 | 2 | 3 | 4 | 5 |
| | | Family's Replenishment Quantity | | | | |
| | | 400 | 300 | 200 | 200 | 250 |
| Composite Product Index $P_{white,t}$ | White | 17.7% | 17.5% | 18.2% | 21.9% | 21.1% |
| Demand Quantity | White | 120 | 90 | 45 | 40 | 45 |
| Replenishment Quantity | White | 71 | 53 | 36 | 44 | 53 |
| Available Inventory Quantity | White | 45 | 8 | 0 | 4 | 12 |
| Composite Product Index $P_{blue,t}$ | Blue | 24.3% | 22.4% | 22.1% | 21.3% | 21% |
| Demand Quantity | Blue | 110 | 115 | 50 | 50 | 48 |
| Replenishment Quantity | Blue | 97 | 67 | 44 | 43 | 53 |
| Available Inventory Quantity | Blue | 67 | 19 | 13 | 6 | 11 |
| Composite Product Index $P_{red,t}$ | Red | 26.8% | 26.2% | 25.2% | 25.2% | 22.7% |
| Demand Quantity | Red | 190 | 116 | 65 | 35 | 60 |
| Replenishment Quantity | Red | 107 | 79 | 50 | 50 | 57 |
| Available Inventory Quantity | Red | 57 | 20 | 5 | 20 | 17 |
| Composite Product Index $P_{yellow,t}$ | Yellow | 10.7% | 13.1% | 12.6% | 10.9% | 11% |
| Demand Quantity | Yellow | 90 | 40 | 10 | 30 | 38 |
| Replenishment Quantity | Yellow | 43 | 39 | 25 | 22 | 28 |
| Available Inventory Quantity | Yellow | 13 | 12 | 27 | 19 | 9 |
| Composite Product Index $P_{gray,t}$ | Gray | 20.5% | 20.8% | 21.9% | 20.7% | 24.2% |
| Demand Quantity | Gray | 130 | 80 | 40 | 50 | 55 |
| Replenishment Quantity | Gray | 82 | 62 | 44 | 41 | 61 |
| Available Inventory Quantity | Gray | 22 | 4 | 8 | 0 | 6 | databases may be available in a supply chain management system such as through an enterprise resource planning (ERP) system software platform.

In responding to the request from the user, server 206 may access historical time series data in database 208 including sufficient data to compute, or simply including in pre-computed form, inventory, demand, and/or composite product mixes. Server 206 may also access future or projected time series data including data sufficient to compute, or simply including in pre-computed form, projected inventory, demand, and/or composite product mixes. The request from the user may include total target replenishment quantities for a plurality of future time periods, or the request from the user may include an instruction to server 206 to access such total target replenishment quantities as necessary from a database such as database 208. The server 206 may perform calculations necessary to determine and use a projected demand mix and project inventory mix as disclosed above.

In step 406, the server 206 may then perform calculations to determine a composite product mix for the product family. Server 206 may compute available inventory quantities and replenishment quantities for each of the individual products, in step 408.

In steps 410 and 412, the process may iterate for the desired number of periods in the horizon, but at least once more. The In the above mentioned embodiments of the invention, it should be noted that the timing of certain events may vary greatly. For example, in at least one embodiment, the user may send a request using input device 106 associated with client 202, and the server 206 may not respond to the request until some later time. Server 206 may perform according to the methods disclosed herein at the predetermined time and then transmit the data to client 202. Client 202 may receive the data by reading an email, opening a file, or by using web browser 204 at some time after server 206 transmits it. In other embodiments, server 206 may wait for a second request before transmitting the data to client 202. These and many other embodiments and modifications are well within the scope and spirit of this disclosure.

Figure 5:
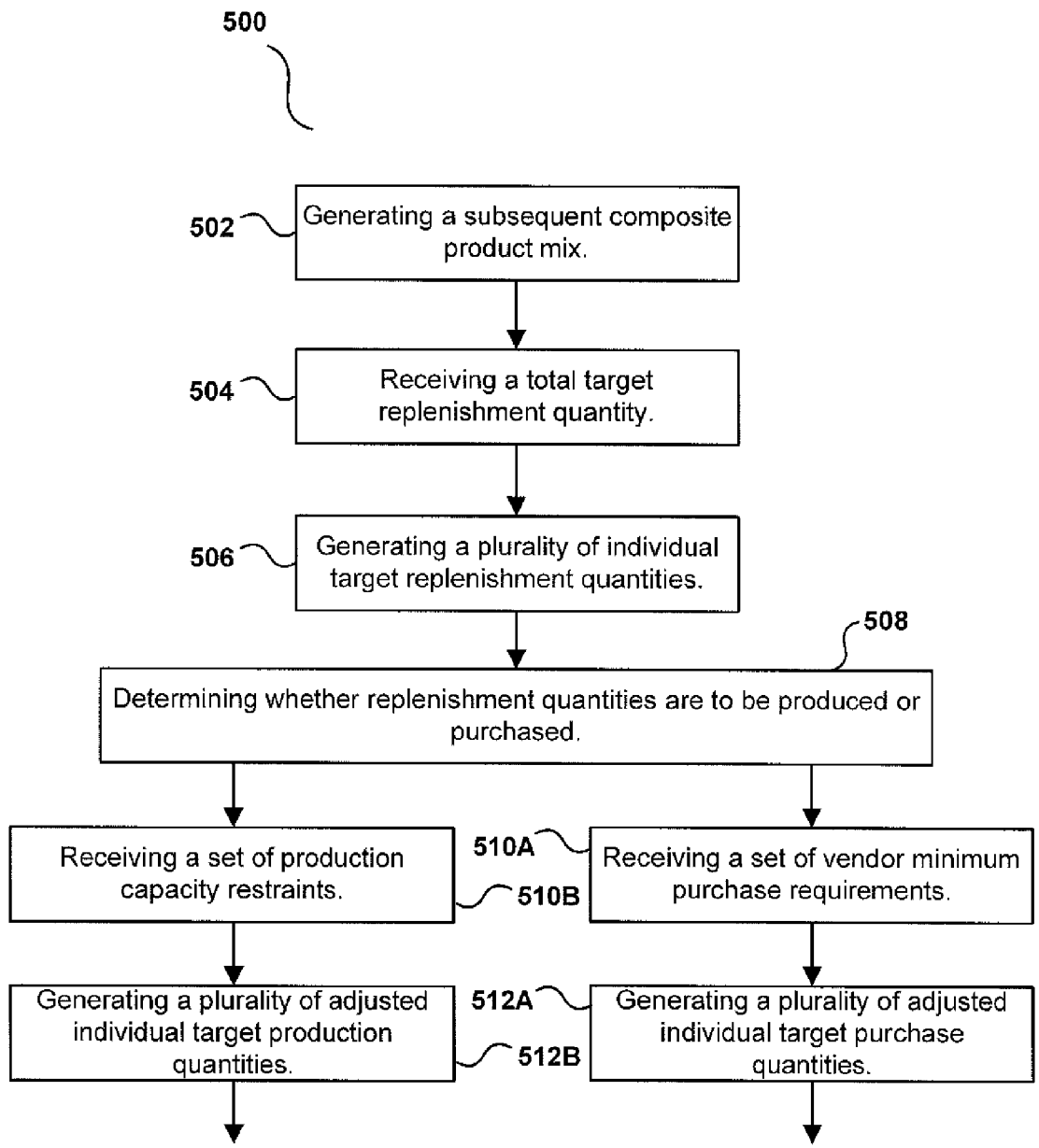
FIG. 5 depicts a flowchart of a method for forecasting individual target replenishment quantities in a production-constrained or vendor-minimum purchase process.

FIG. 5 depicts a flowchart of a method 500 for generating a plurality of adjusted individual target replenishment quantities. Some steps of method 500 may be performed substantially as described above in method 300. Thus, steps 502, 504, and 506 may be performed in substantially the same manner as steps 306, 308, and 310 respectively. At step 508 of method 500, computer processor 102 may determine whether the plurality of individual target replenishment quantities, generated in step 506, are to be produced or purchased. This may be done by receiving a replenishment process indication parameter from database 208. A user of a disclosed system may have previously entered the replenishment process indication parameter.

The replenishment of products may be limited due to production capacity when replenishment is by production, or it may be limited due to vender-imposed minimum requirements when replenishment is by purchase. If the indication parameter indicates the replenishment process is a purchase process, computer processor 102 may request and receive a set of vendor minimum requirements in step 510A. In step 512A, computer processor 102 may generate a plurality of adjusted individual target purchase quantities. The production quantities may be based on the received replenishment quantities and the set of production capacity constraints.

An example is included to describe how the use of the new composite product mix may be beneficial in a vendor-minimum context such as method 500. Following the shirts example as given above in Table 4, and assuming a vendor-imposed minimum purchase requirement of 8,000 shirts total per order was received in step 510A, the method and systems disclosed can help to allocate the amount that should be purchased of each color. The 7,000 shirt total target replenishment quantity for Period 4 in Table 4 is 1,000 shirts short of the vendor minimum. The computer processor 102 or server 206 may be configured to receive the vendor-imposed minimum total quantity of 8,000 (step 510A).

Step 512A may be performed as in the embodiments that follow. The computer processor 102 or server 206 may then determine a total difference (TD) between the vendor-imposed minimum total quantity (TVM) and the total target replenishment quantity (TRQ) by subtracting the total target replenishment quantity from the vender-imposed minimum total quantity, i.e., TD=TVM−TRQ.

In this example the computer processor 102 will register the total difference as a positive difference of 1,000, since the vendor-minimum total quantity is larger than total target replenishment quantity. If the total difference were zero or negative, computer processor 102 would make no quantity adjustments, as this would indicate the total purchase quantity determined in step 506 exceeds the vendor minimum. In this example however, the computer processor 102 will make a total quantity adjustment equal to the total difference. The computer will multiply the total quantity adjustment by the new composite product mix to determine appropriate individual quantity adjustments.

In this example, using the new composite product mix from Table 3 and the forecast of Period 4 in Table 4, the individual quantity adjustments would be approximately 177, 243, 268, 107, and 205 for white, blue, red, yellow, and gray shirts respectively. The individual quantity adjustments necessitated by the vendor minimum may be communicated discretely to the user by display 108 in addition to the composite product mix and/or unadjusted individual target replenishment quantities. Alternatively, computer processor 102 may add the individual quantity adjustments to the unadjusted individual target replenishment quantities before displaying adjusted individual target replenishment quantities to the user.

In the preceding example, the vendor minimum was imposed only on the total quantity of an order. A vendor minimum may also be imposed at the level of the individual products. Additionally, a vendor may have minimum purchase requirements for individual products in addition to product-family level requirements. Computer processor 102 or server 206 may be supplied with an individual vendor minimum for each individual product k in step 510A. For example, the particular vendor could require an individual vendor minimum of 1000 shirts of any given color in addition to the total vendor minimum quantity from above of 8000. In such an instance, a more general approach must be taken to determine the appropriate individual quantity adjustments.

A more general embodiment of step 512A follows. The computer processor 102 will further compute individual differences for each of the individual products. Similarly to the computation of the total difference above, only when the individual vendor minimum is greater than the individual target replenishment quantity for an individual product will an individual difference be considered as a non-zero value. The individual differences are computed as the difference between the individual vendor minimums and the corresponding individual target replenishment quantities.

If the sum of all the individual differences is greater than or equal to the total difference (as determined by the total vendor minimum), then the computer processor 102 or server 206 may compute an intermediate individual quantity adjustment for each individual product. The intermediate individual quantity adjustments increase the target individual purchase quantities that are below the individual vendor minimum up to the individual vendor minimum. Thus satisfying the vendor's individual product minimum requirements and total quantity requirements.

If the sum of all the individual differences is less than the total difference, then the computer processor or server will first increase the target individual purchase quantities that are below the individual vendor minimum up to the individual vendor minimum as indicated above. Then, the computer processor 102 or server 206 will calculate an intermediate total difference similar to the total difference above, but that is decreased by the sum of intermediate individual quantity adjustments. The intermediate total difference will then be used by the computer processor 102 or server 206 and the new composite product mix to determine the individual quantity adjustments to increase the total target replenishment quantity up to the vendor-minimum total quantity.

Relative to method 300 as disclosed above, in some embodiments vendor minimum requirements may be received by computer processor 102 or server 206 from database 208, and adjustments may be made as described, after step 310. In other embodiments, the vender minimum requirements may be received by computer processor 102 or server 206 before step 310. Method 400 may also be altered to incorporate the vendor minimum process as well.

Returning to step 506 of method 500, if the indication parameter indicates the replenishment process is a production process, computer processor 102 may request and receive a set of production capacity constraints in step 510B. In step 512B, computer processor 102 may generate a plurality of adjusted individual target production quantities. The adjusted production quantities may be based on the received replenishment quantities and the set of production capacity constraints.

For example, a production line may only be able to produce a certain number of shirts due to throughput limitations on equipment or difficulty acquiring sufficient input materials or labor. As a numerical example, suppose that the shirt production line is not able to produce more than 13,300 shirts in any given period due to throughput limitations of the shirt-making machines. This is 700 fewer shirts than the total target replenishment quantity called for during the Christmas shopping season in Period 3 (December) of Table 4.

Computer processor 102 or server 206 may receive a value or values for the production capacity constraints in ways similar to other data disclosed herein (step 510B). The computer processor 102 or server 206 may be operable to compute a total difference between the total target production quantity and the capacity constrained production limit to generate a total target production quantity adjustment (step 512B).

Step 512B may be performed as in the following embodiment. The total target production quantity adjustment is multiplied by the new composite product mix to generate an individual quantity adjustment for each of the individual products in the product family. The individual quantity adjustments can then be subtracted from the individual target production quantities previously computed in the absence of the constraint to form adjusted individual target production quantities. The disclosed steps for adjusting target production quantities may also be incorporated into method 400.

Given the nature of forecasting, it may be useful to the user to determine a forecast error associated with the new composite product mix. Computing the mean absolute deviation may be useful to the user in making such a determination. Therefore, in at least some embodiments, the computer processor 102 may be further configured by hardware or software instruction to compute the mean absolute deviation according to:

$$\sum_{t=-n}^{-1} \sum_{k=1}^{m} \left| \frac{(u_{t+1} \times P_{k,t+1} + r_t \times I_{k,t}) - (s_{t+1} \times D_{k,t+1})}{m \times n} \right|,$$

wherein:
  $u_{t+1}$ is a total replenishment quantity associated with the product family at a time t+1;
  $D_{k,t}$ is a historical demand mix component for an individual product k at a time t;
  $r_t$ is a total actual inventory quantity for the product family at t;
  $I_{k,t}$ is a historical inventory mix component for k at t;
  $s_{t+1}$ is a total actual demand quantity for the product family at t+1;
  n is a total number of historical periods for which data is available; and
  m is a total number of the plurality of individual products in the product family.

These quantities may be available to computer processor 102 and server 206 as disclosed above in connection with other data such as inventory and demand data and stored inventory and demand mix data. The mean absolute deviation may be displayed to the user in similar ways as those used to display the new composite product mix. In the context of determining the forecast error using the equation above, t may be a historical period, rather than a projected or current period as t is used in the context of determining forecasted replenishment quantities.

A portion of the mean absolute deviation equation may be used to determine a forecasting error at the level of an individual product. The computer processor may computer an individual product forecasting error according to the following:

$$\sum_{t=-n}^{-1} \frac{(u_{t+1} \times P_{k,t+1} + r_t \times I_{k,t}) - (s_{t+1} \times D_{k,t+1})}{n}$$

for each individual product k = 1, 2, ... m.

A positive error value for a particular k may indicate an over-stocking error, while a negative value may indicate an under-stocking error. The terms used in the equation immediately above are identically defined as those of the mean absolute deviation expression also above. In some embodiments, a user may be presented with an option to manually override a replenishment plan when the individual error terms exceed a threshold. The above error calculations may be performed automatically at after the performance of method 300, 400, or 500.

Generally, in the embodiments above, only a single product family has been dealt with at a time. However, in some embodiments, server 206 may be configured to spawn multiple worker threads, a thread for each of a plurality of product lines. For example, a user may request that system 100 or 200 produce a replenishment plan for a line of shirts, a line of sweaters, and a line of ski jackets. The system may respond by spawning a first thread for the generation of the shirt replenishment plan, a second thread for the sweater replenishment plan, and a third thread for the ski jacket replenishment plan. In some embodiments an additional thread may be spawned for the calculation of forecast errors as described above. All or some of these threads may run simultaneously on server 206. Threading in this manner may allow the user to obtain replenishment plans with less delay.

Additionally, in some embodiments, inventory and demand data may be available in database 208 that include more than one descriptor for individual products. In the examples above, color was used as the individual product descriptor. Some embodiments may include other descriptors or tiered descriptors. For example, in addition to containing inventory and demand data for the five colors of shirts in a product family, database 208 may contain inventory and demand data for three shirt sizes, e.g., small, medium, and large, for each of the five colors of shirts. Therefore, a composite product mix may be calculated to indicate the replenishment quantities of each available size for each available color.

In embodiments of the invention that include tiered descriptors for individual products, server 206 may calculate a first-tier composite product mix for the first descriptor tier (e.g., color) and a second-tier composite product mix for the second descriptor tier, (e.g., size within a single color). Server 206 may determine replenishment quantities at the color-tier and then determine the proper allocation of the replenishment quantities at the size-tier for each color.

For example, a second-tier composite product mix may indicate that for a given replenishment quantity of shirts of a specific color, 10% should be small, 40% should be medium, and 50% should be large. If the replenishment plan indicated 500 red shirts should be purchased or produced in the upcoming operational period, the second-tier composite product mix would indicate that 50 shirts should be small, 200 should be medium, and 250 should be large. The methods as disclosed above may be readily adapted to facilitate planning in product family environment where individual products have two or more tiered descriptors.

The embodiments described herein are only examples of the invention. Other embodiments of the invention that are within the scope and spirit of this disclosure will be apparent to those skilled in the art from consideration of the specification and practice of the invention disclosed herein. It is intended that the specification and examples be considered as exemplary only and not limiting. The scope of the invention, therefore, is limited only by the following claims.

What is claimed is:

1. A system for forecasting the future supply chain needs of a plurality of individual products within a product family, the system comprising:
   a data storage device storing at least a current composite product mix, wherein the current composite product mix comprises percentages for the plurality of individual products within the product family;
   a computer processor configured to:
      receive a first parameter α and a second parameter β for the product family,
      receive the current composite product mix $P_{k,t}$ for product k at a time t, a current demand mix $D_{k,t}$ for product k at time t, and a current inventory mix $I_{k,t}$ for product k at time t, the mixes being associated with the product family, and
      generate a new composite product mix $P_{k,t+1}$ for product k at time t+1 according to:

$P_{k,t+1} = \beta(\alpha D_{k,t} + (1-\alpha)I_{k,t}) + (1-\beta)P_{k,t}$, wherein:

β represents a weighting smoothing factor which is a real number equal to or between 0 and 1 indicating a level of weight to be applied to the current demand mix and the current inventory mix;
      α represents a confidence smoothing factor which is a real number equal to or between 0 and 1 indicating a confidence level in the current demand mix or the current inventory mix; and
   a display in connection with the computer processor for communicating the new composite product mix.

2. The system of claim 1, wherein the computer processor is configured to receive data from at least one data storage device accessed via a computer network, the data comprising at least one of the first parameter, the second parameter, the current demand mix, the current inventory mix, and the current composite product mix.

3. The system of claim 1, wherein the computer processor is a server, the server is further configured to retrieve from a database at least one of the current demand mix, the current inventory mix, and the current composite product mix and communicate the new composite product mix to a client computer.

4. The system of claim 3, wherein retrieving from the database at least one of the current demand mix, the current inventory mix, and the current composite product mix comprises:
   retrieve inventory data and demand data from at least one operational period;
   generating at least one demand mix and at least one inventory mix; and
   generating the new composite product mix based on the at least one demand mix and the at least one inventory mix, and the current composite product mix.

5. The system of claim 1, wherein the computer processor is further configured to receive a family target replenishment quantity associated with the product family.

6. The system of claim 5, wherein the computer processor is further configured to compute a plurality of individual target replenishment quantities for each of the plurality of individual products using the new composite product mix and the family target replenishment quantity.

7. The system of claim 6, wherein the computer processor is further configured to compute a plurality of individual target replenishment quantities for each of a plurality of future operational periods using the new composite product mix and a plurality of family target replenishment quantities associated with the plurality of future operational periods.

8. The system of claim 1, wherein the current inventory mix is computed by dividing a plurality of reciprocals of an inventory quantity of each of the plurality of individual products by the sum of the plurality of reciprocals to yield a percentage inventory value for each of the plurality of individual products.

9. The system of claim 1, wherein the computer processor is further configured to compute an error associated with the new composite product mix.

10. The system of claim 9, wherein calculating the error associated with the new composite product mix is performed by the computer processor according to:

$$\frac{\sum_{t=-n}^{-1}\sum_{k=1}^{m}|(u_{t+1} \times P_{k,t+1} + r_t \times I_{k,t}) - (s_{t+1} \times D_{k,t+1})|}{m \times n},$$

wherein:
   $u_{t+1}$ is a total replenishment quantity associated with the product family at a time t+1;
   $D_{k,t}$ is a historical demand mix component for an individual product k at a time t;
   $r_t$ is a total inventory quantity for the product family at t;
   $I_{k,t}$ is a historical inventory mix component for k at t;
   $s_{t+1}$ is a total demand quantity for the product family at t+1;
   m is a total number of individual products in the product family; and
   n is a total number of historical periods for which data is available.

11. A method for creating a new composite product mix of a product family, comprising the steps of:
   receiving a first parameter and a second parameter into a data storage device;
   receiving a current composite product mix, a current demand mix, and a current inventory mix, the mixes being associated with a plurality of individual products within the product family, into the data storage device;
   generating, by use of a computer processor, the new composite product mix associated with the product family according to:

$P_{k,t+1} = \beta(\alpha D_{k,t} + (1-\alpha)I_{k,t}) + (1-\beta)P_{k,t}$, wherein:

β is the second parameter which represents a smoothing factor which is a real number equal to or between 0 and 1 indicating a level of weight to be applied to the current demand mix and the current inventory mix;
   α is the first parameter which represents a smoothing factor which is a real number equal to or between 0 and 1 indicating a confidence level in the current demand mix or the current inventory mix;
   $D_{k,t}$ is the current demand mix percentage for an individual product k at a time t;
   $I_{k,t}$ is the current inventory mix percentage for k at t;
   $P_{k,t+1}$ is the current composite product mix percentage for k at t; and
   $P_{k,t+1}$ is the new composite product mix percentage for k at t+1;
   receiving a total target replenishment quantity for the product family; and
   generating a plurality of individual target replenishment quantities for each of the plurality of individual products within the product family based on the new composite product mix and the total target replenishment quantity.

12. The method of claim 11, further comprising:
determining whether the product family is subject to a replenishment limitation;
receiving a replenishment-limitation value;
computing adjustments to the plurality of individual target replenishment quantities based on the new composite product mix and the replenishment-limitation value; and
generating a plurality of adjusted individual target replenishment quantities.

13. The method of claim 11, further comprising receiving from a database a set of data comprising historical inventory data and historical demand data.

14. The method of claim 13, further comprising generating, by use of a computer processor, at least one of the current demand mix, the current inventory mix, and the current product mix from the set of data comprising historical inventory data and historical demand data.

15. The method of claim 11, further comprising calculating an error value associated with the new composite product mix.

16. The method of claim 11, further comprising using a plurality of total target replenishment quantities associated with a plurality of future time periods and the new composite product mix to compute a multi-period plurality of individual target replenishment quantities.

17. A non-transitory machine-readable medium comprising a plurality of machine-readable instructions which when executed by one or more processors of a computer are configured to cause the computer to perform a method comprising:

receiving a first parameter and a second parameter;
receiving a current composite product mix for a plurality of individual products within a product family, the current composite product mix containing a plurality of percentage values corresponding to each of the plurality of individual products;
receiving a current demand mix and a current inventory mix wherein the mixes are associated with the product family;
generating a new composite product mix for the plurality of individual products within the product family according to:

$$P_{k,t+1} = \beta(\alpha D_{k,t} + (1-\alpha)I_{k,t}) + (1-\beta)P_{k,t}, \text{ wherein:}$$

$\beta$ is the second parameter which represents a smoothing factor which is a real number equal to or between 0 and 1 indicating a level of weight to be applied to the current demand mix and the current inventory mix;

$\alpha$ is the first parameter which represents a smoothing factor which is a real number equal to or between 0 and 1 indicating a confidence level in the current demand mix or the current inventory mix;

$D_{k,t}$ is the current demand mix percentage for an individual product k at a time t;

$I_{k,t}$ is the current inventory mix percentage for k at t;

$P_{k,t}$ is the current composite product mix percentage for k at t; and $P_{k,t+1}$ is the new composite product mix percentage for k at t+1; and generating a target replenishment quantity of each of the plurality of individual products using the current composite product mix.

* * * * *